(12) United States Patent
Denis et al.

(10) Patent No.: US 10,156,154 B2
(45) Date of Patent: Dec. 18, 2018

(54) POST FBO WINDMILLING BUMPER

(71) Applicant: PRATT & WHITNEY CANADA CORP., Longueuil (CA)

(72) Inventors: David Denis, Burlington (CA); Philippe Bonniere, Toronto (CA); Milica Kojovic, Oakville (CA); Oleg Korshikov, Oakville (CA); Lena Raykowski, Mississauga (CA); Czeslaw Wojtyczka, Brampton (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 6 days.

(21) Appl. No.: 15/692,290

(22) Filed: Aug. 31, 2017

(65) Prior Publication Data

US 2017/0362954 A1    Dec. 21, 2017

Related U.S. Application Data

(62) Division of application No. 14/138,821, filed on Dec. 23, 2013, now Pat. No. 9,777,592.

(51) Int. Cl.

| F01D 21/04 | (2006.01) |
| F01D 25/16 | (2006.01) |
| F16C 19/06 | (2006.01) |
| F16C 33/58 | (2006.01) |
| F16C 35/067 | (2006.01) |

(52) U.S. Cl.
CPC .......... *F01D 21/045* (2013.01); *F01D 25/164* (2013.01); *F16C 19/06* (2013.01);
(Continued)

(58) Field of Classification Search
CPC ........ F01D 21/04; F01D 21/045; F01D 25/16; F01D 25/162; F01D 25/164; F16C 19/06;
(Continued)

(56) References Cited

U.S. PATENT DOCUMENTS

| 4,375,906 A | 3/1983 | Roberts et al. |
| 5,791,789 A | 8/1998 | Van Duyn et al. |

(Continued)

FOREIGN PATENT DOCUMENTS

| GB | 1418907 | 12/1975 |
| JP | H01159420 A | 6/1989 |

*Primary Examiner* — Jason Shanske
*Assistant Examiner* — Julian Getachew
(74) *Attorney, Agent, or Firm* — Norton Rose Fulbright Canada LLP

(57) ABSTRACT

A bearing arrangement rotatably supports a shaft of an aircraft engine. The bearing arrangement comprises a bearing having rolling elements disposed between inner and outer races. The inner race is affixed to the shaft. A decoupler normally structurally couples the outer race of the bearing to a stator structure of the engine. The decoupler is configured to release the bearing from the stator structure when subject to a predetermined critical load. A bumper is mounted to the stator structure and encircles the bearing. The bumper has a radially inwardly facing surface disposed in close proximity to a radially outer surface of the outer race of the bearing and defines therewith a radial gap to accommodate and constrain an orbiting motion of the rotor about the central axis of the engine after decoupling at the bearing. The bumper further has an axially forwardly facing surface which is axially spaced by a predetermined axial fore gap from a first flange projecting radially outwardly from a front end portion of the outer race of the bearing. The first flange of the outer race is axially trapped between the stator structure and the bumper. After decoupling, the bearing is free to axially and radially move within the radial gap and the axial fore gap.

5 Claims, 4 Drawing Sheets

(52) U.S. Cl.
CPC .......... *F16C 33/586* (2013.01); *F16C 35/067* (2013.01); *F16C 2360/23* (2013.01); *Y02T 50/671* (2013.01)

(58) Field of Classification Search
CPC ... F16C 33/586; F16C 35/067; F16C 2360/23
USPC ........................................ 415/9, 229; 416/2
See application file for complete search history.

(56) References Cited

U.S. PATENT DOCUMENTS

| | | |
|---|---|---|
| 5,974,782 A | 11/1999 | Gerez |
| 6,098,399 A | 8/2000 | Richards et al. |
| 6,109,022 A | 8/2000 | Allen et al. |
| 6,149,380 A | 11/2000 | Kuzniar et al. |
| 6,325,546 B1 | 12/2001 | Storace |
| 6,447,248 B1 | 9/2002 | Kastl et al. |
| 6,827,548 B2 | 12/2004 | Coxhead et al. |
| 7,195,444 B2 | 3/2007 | Brault et al. |
| 7,237,959 B2 | 7/2007 | Bouchy et al. |
| 7,448,808 B2 | 11/2008 | Bouchy et al. |
| 7,404,678 B2 | 7/2009 | Plona |
| 7,565,796 B2 | 7/2009 | Eleftheriou et al. |
| 7,909,514 B2 | 3/2011 | Plona |
| 8,128,339 B2 | 3/2012 | Kondo et al. |
| 8,166,746 B2 | 5/2012 | Heyerman |
| 2010/0266384 A1 | 10/2010 | Evans et al. |
| 2011/0085906 A1 | 4/2011 | Scothem |
| 2013/0022448 A1 | 1/2013 | Jadczak et al. |
| 2013/0202349 A1 | 8/2013 | Coffin |

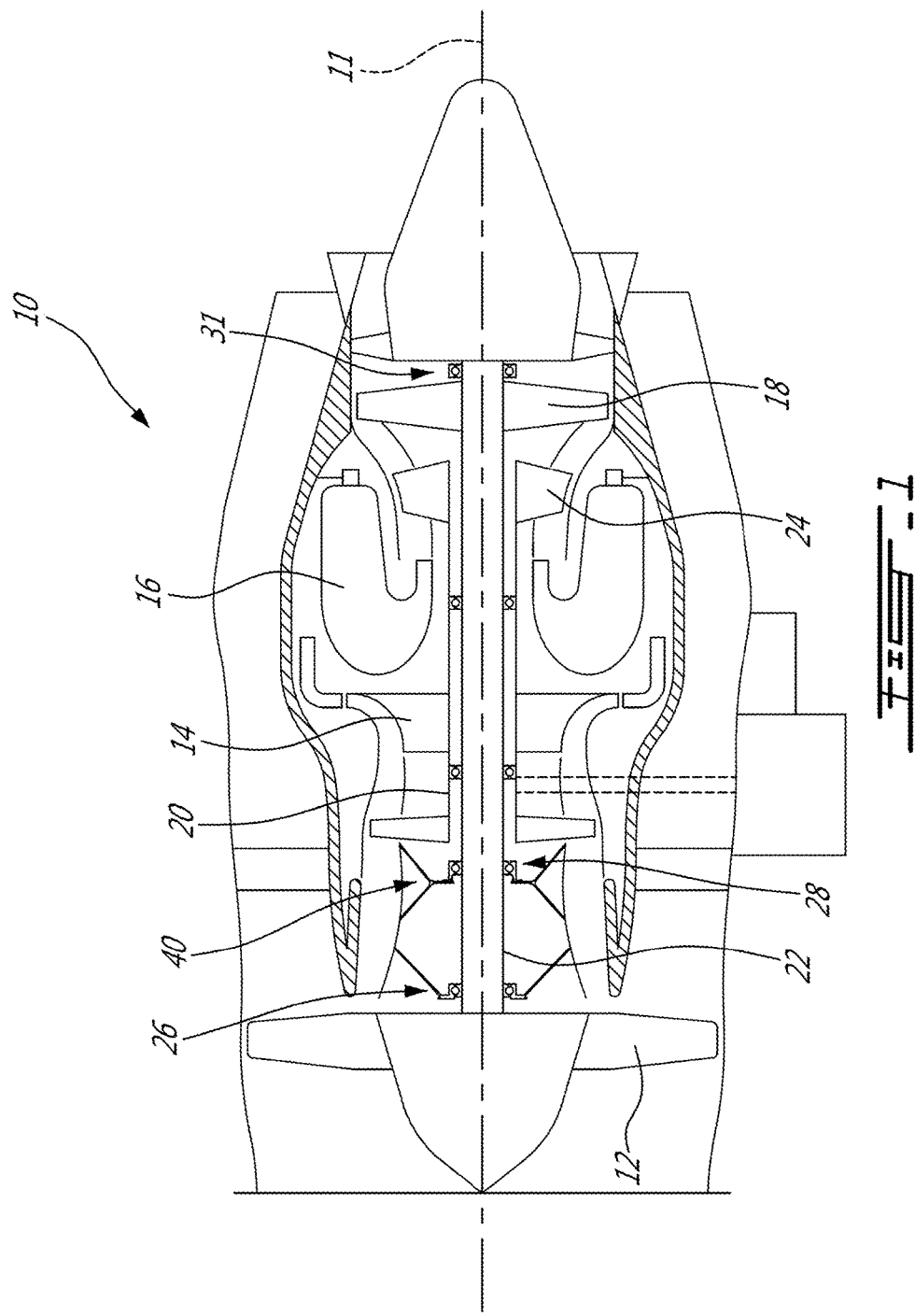

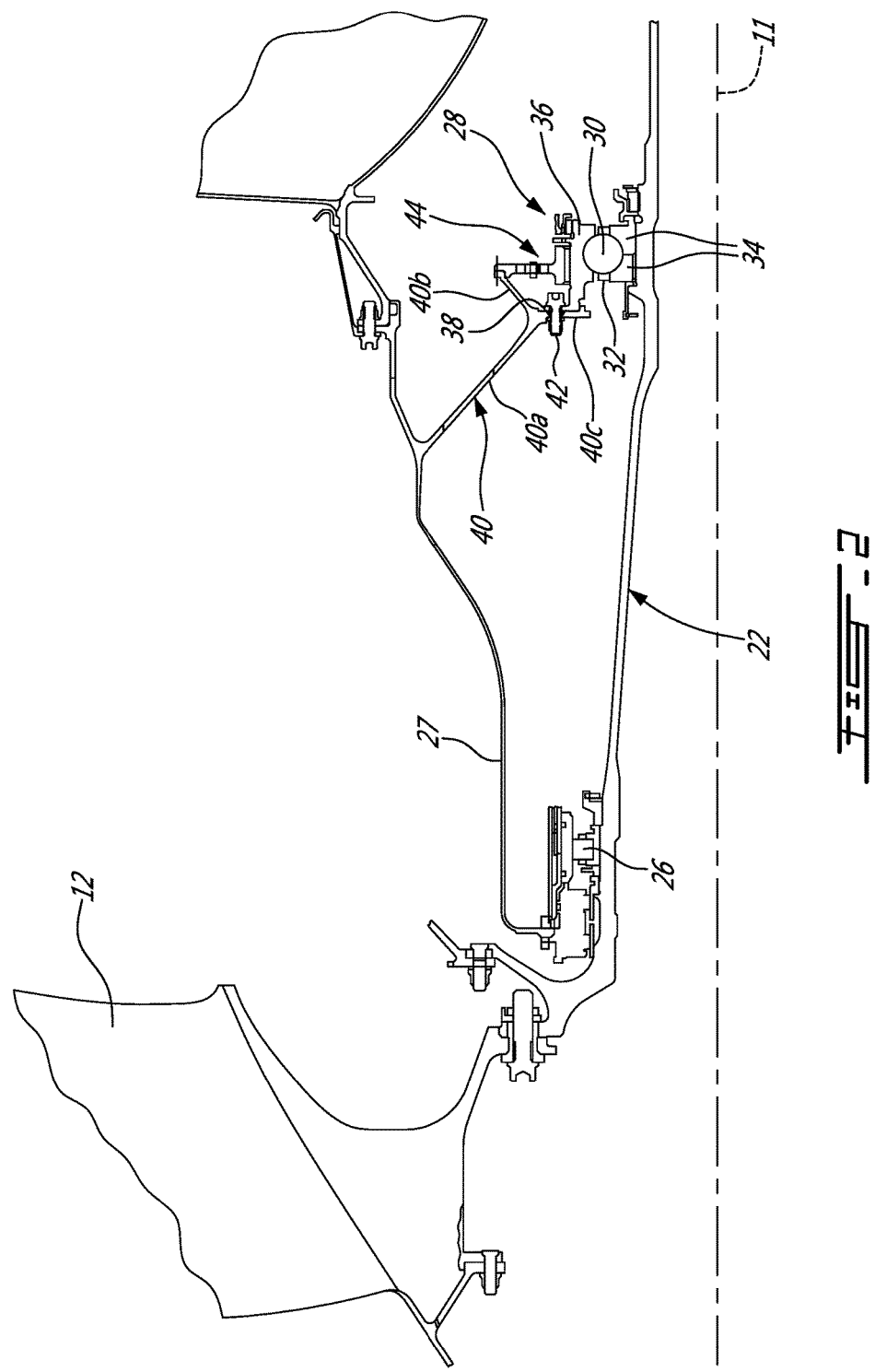

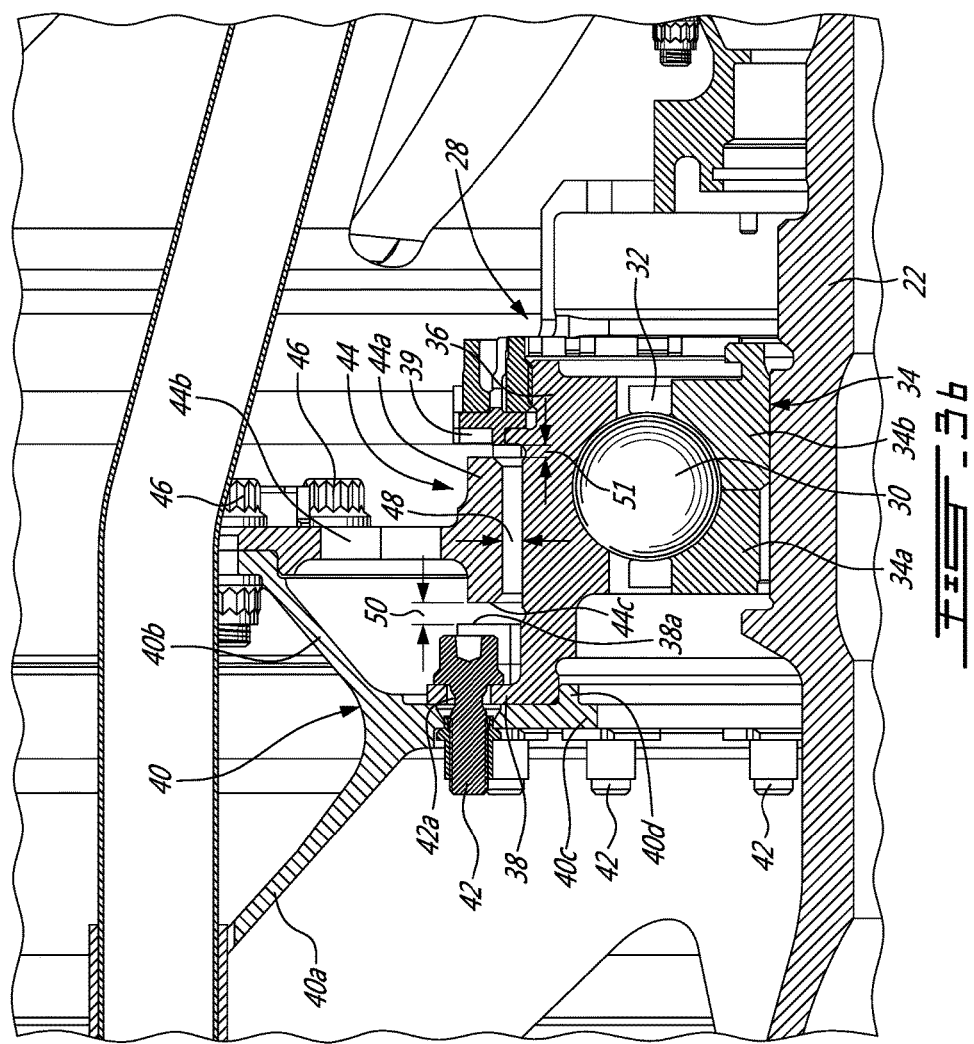

POST FBO WINDMILLING BUMPER

RELATED APPLICATIONS

This application is a divisional of U.S. Pat. No. 9,777,592 issued on Oct. 3, 2017, the content of which is hereby incorporated by reference.

TECHNICAL FIELD

The application relates generally to aircraft engines and, more particularly, to a bearing and bumper arrangement for a shaft rotating in an aircraft engine.

BACKGROUND OF THE ART

The fans of aircraft engines are designed to resist damage caused by foreign object ingestion. However, in certain circumstances, a fan may be damaged to such an extent that parts of one or more of the fan blades become detached from the rotor disk (referred to herein as a fan blade off event or FBO event). This may result in a significant imbalance requiring shutdown of the engine to minimise load transmission to the aircraft. The imbalance in the fan created by the blade loss generates extremely high radial loads which must at least be partially absorbed as the engine is run down to windmilling speed (i.e. the speed at which the rotor spins in a non-operative condition as a result of the aircraft moving through the air).

Under certain circumstances, the vibration resulting from the fan imbalance at windmilling speed can still be considerable. If not appropriately controlled, these vibrations may damage the engine structure and the aircraft and present difficulties to control the aircraft during approach.

SUMMARY

In one aspect, there is provided a turbofan gas turbine engine comprising: a stator structure, a bearing assembly coupled to the stator structure by a shear connection, the bearing assembly including a bearing for rotatably supporting about a central axis a shaft assembly carrying a propulsive fan rotor; and a bumper mounted to the stator structure independently of the bearing assembly, the bumper encircling the bearing and having a radially inwardly facing surface spaced apart from a radially outer surface of an outer race of the bearing to define a radial gap between them, the bumper configured to restrain, in use, at least radial outward movement of the rotor in the event of a failure of the shear connection, and wherein the radial gap is sized to, in use, limit vibratory modes transmitted to the engine caused by rotation of the shaft assembly after said failure of the bearing assembly.

In a second aspect, there is provided a bearing arrangement for supporting a fan rotor of an aircraft engine, comprising a bearing having rolling elements disposed between inner and outer races, a bearing support for supporting the bearing on a stator structure of the engine, a decoupler between the bearing and the bearing support, the decoupler being configured to release the bearing from the bearing support when subject to a predetermined critical load, a bumper surrounding the bearing, a portion of the bearing being axially trapped between the bearing support and the bumper to provide rotor axial retention upon decoupling of the bearing from the bearing support structure, the bumper and the outer race of the bearing defining a radial gap and an axial gap therebetween, the bearing being free to move within said radial and axial gaps when the fan rotor rotates at windmilling speed after decoupling of the bearing from the bearing support.

In accordance with a further aspect, there is provided a method of enabling operation of an aircraft turbofan engine to be continued at least at windmilling speed after an FBO or other exceptional event resulting in excessive rotor imbalance conditions, the rotor being rotatably supported on a static structure of the engine by bearings, the method comprising releasing at least one of said bearings from said stator structure, and constraining an orbiting motion of said bearing by allowing the bearing to freely move within a surrounding bumper independently mounted to stator structure.

DESCRIPTION OF THE DRAWINGS

Reference is now made to the accompanying figures, in which:

FIG. 1 is a schematic cross-sectional view of a turbofan gas turbine engine having a bearing arrangement designed to reduce aircraft response, during in flight windmilling, to a post fan blade-off event, such that the housing of the #2 bearing housing becomes "free" within a surrounding bumper which reduces the load transmission into the aircraft in the exceptional event of an excessive rotor imbalance;

FIG. 2 is an axial section view of the double frangible bearing arrangement with a thrust bearing bumper;

FIG. 3b is a further enlarged axial section view of the #2 bearing and bumper arrangement.

DETAILED DESCRIPTION

Figure 3A:
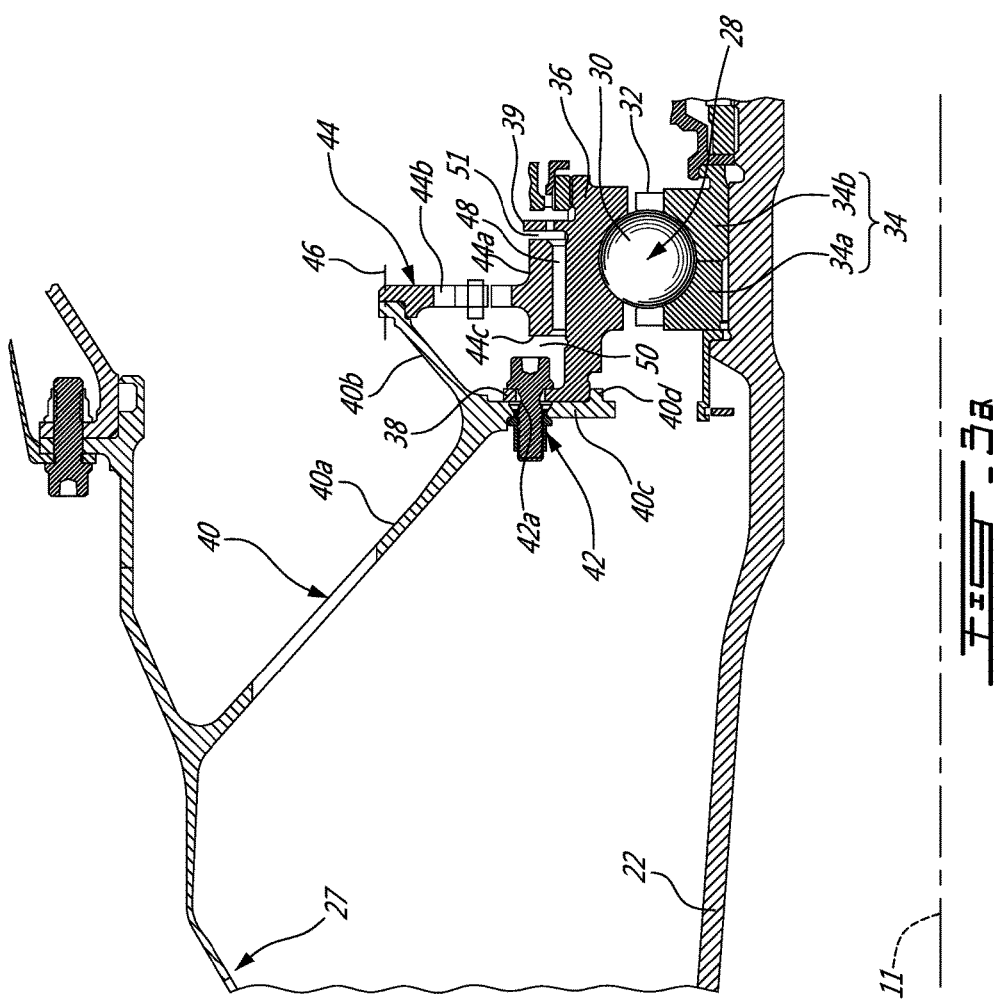
FIG. 3a is an axial section view of the #2 bearing and bumper arrangement.

FIG. 1 illustrates a turbofan gas turbine engine 10 of a type preferably provided for use in subsonic flight and generally comprising a low pressure spool assembly, which includes a fan assembly 12, a low pressure compressor assembly (not shown) and a low pressure turbine assembly 18 connected by a low pressure shaft 22, and a high pressure spool assembly, which includes a high pressure compressor assembly 14 and a high pressure turbine assembly 24 connected by a high pressure shaft 20. The engine 10 further comprises a combustor 16 in which compressed air from the high pressure compressor 14 is mixed with fuel and ignited for generating an annular stream of hot combustion gases from which the low pressure and high pressure turbine sections extract energy, as known in the art.

The low pressure spool is rotatably supported by a number of axially spaced-apart bearings concentrically mounted about the central axis 11 of the engine 10. The low pressure shaft 22 is supported at its front or upstream end by first and second bearings 26 and 28 respectively commonly referred to as the #1 and #2 bearings and at a rear end thereof by a third bearing 31 which may be the #5 bearing of the engine (the #3 and #4 bearings rotatably supporting the high pressure shaft 20). The bearing arrangement for a particular engine, including but not limited to the number and type of bearings selected, is typically determined by a number of factors specific to that engine. The bearing arrangement described herein is exemplary only, and not intended to be limiting. In this example, the forward and rearward most bearings, i.e. the #1 and #5 bearings, may be roller bearings for radially supporting the low pressure shaft 22. The #2 bearing 28 may be a thrust bearing to provide both axial and radial support to the low pressure shaft 22. As shown in FIG. 1, the first bearing 26 is disposed adjacent the fan rotor, while the #2 bearing 28 is disposed adjacent to and downstream from the first bearing 26, and upstream of the high pressure compressor 14 relative to a flow direction of the gases through the engine 10. The bearings and supporting structure flanges may be arranged in any suitable fashion in the context of the present application.

The first bearing 26 is supported on the stator structure of the engine by a bearing support 27. To minimize the effect of potentially damaging abnormal imbalance loads (e.g. such as caused by fan blade-off-induced imbalance loads), the bearing support 27 is designed to frange when subject to a predetermined critical load. As shown in FIG. 2, the #1 bearing support 27 may be provided in the form of a fusible conical structure connected to an outer race of the #1 bearing. The fusible conical structure is adapted to fail when subject to a critical loading condition to thereby decouple the #1 bearing 26 from the stator structure of the engine 10. The fusible conical structure decouples the #1 bearing from the static structure of the engine by buckling, collapsing, crimping, yielding or fracturing. The net result is that the radial support provided to the #1 bearing is either eliminated or reduced to a negligible value.

Referring to FIG. 2, it can be seen that the #2 bearing 28 may be provided in the form of a thrust bearing having rolling elements 30 (e.g. ball bearing elements) retained by a bearing cage 32 and disposed between inner and outer races 34, 36. The inner race 34 is securely mounted to the low pressure shaft 22. According to the illustrated embodiment, the inner race 34 consists of two half-races 34a, 34b (FIGS. 3a, 3b). However, it is understood that the inner race 34 could be provided as a one-piece component or other suitable configuration. The outer race 36 has a mounting flange 38 projecting radially outwardly from the front end thereof for connection to the #2 bearing support 40 forming part of the stator structure of the engine case. The bearing support 40 has a Y-shaped cross-section including first and second axially opposed frusto-conical portions 40a, 40b flaring away from each other and an annular mounting flange 40c projecting radially inwardly from the junction of the first and second frusto-conical portions 40a, 40b. The mounting flange 40c is provided at its inner diameter with an axially rearwardly projecting spigot 40d (FIGS. 3a, 3b) over which the front end portion of the outer race 36 of bearing 28 is adapted to be axially slid when loaded in position from the rear end of the engine 10.

A series of circumferentially distributed frangible fasteners, such as fusible or shear bolts 42 or the like, may be used to fasten the mounting flange 38 of the outer race 36 to the corresponding mounting flange 40c of the bearing support 40. In use, the fusible bolts 42 may shear for structurally decoupling the #2 bearing 28 from the stator structure of the engine case, and are sized so that shear preferably occurs after decoupling at the #1 bearing 26, thereby preventing the transmission of potentially damaging imbalance forces or other vibratory forces to the engine case and the airframe in the event of a fan blade loss or another abnormal fan rotor imbalance event. It is understood that the shear bolts 42 are not the only possible type of decoupler or shear connection. Other suitable types of decoupler could be used as well. For instance, a fusable flange or frangible support could be used to disconnect the bearing from the engine case. In the illustrated embodiment, the shear bolts 42 have a weakened zone 42a (FIGS. 3a, 3b) to cause the bolts to fracture when subject to bending moment tensile loads, or shear loads, fatigue loads, other loads, or combination thereof, above a pre-determined magnitude, thereby releasing/decoupling the outer race 36 and, thus, #2 bearing 28 from the static structure of the engine case.

The radially inwardly extending flange 40c of the bearing support 40 and the radially outwardly extending flange 38 of the #2 bearing 28 form an inverted flange arrangement which provides more flexibility during normal engine operations than a conventional back-to-back flange arrangement. The inverted flange arrangement is not as stiff when subject to axial loads. The inverted flange arrangement slightly flex so when pulling with thrust, the bolts 42 are not exposed to as much loads and bending as they would if they were on a normal back-to-back flange arrangement. As a result, it is possible to reduce the bolt count and still meet the load cycle fatigue limits for the bolts under normal engine operating conditions. In this way, in the event of a FBO, less bolts need to be ruptured for decoupling the second bearing 28 from the stator structure of the engine 10, which may beneficially result in a more reliable decoupling system. The inverted flange arrangement may also provide a weight saving in some configurations.

Referring more particularly to FIGS. 3a and 3b, it can be appreciated that a bumper 44 encircles the #2 bearing 28 to limit, in use, the amplitude of radial excursions, and in this example also the distance of axial travel, of the bearing (and therefore also the low pressure shaft 22), after decoupling of the #2 bearing outer race as described above. The bumper 44 is preferably configured to withstand the post FBO loads and transmitted to it by #2 bearing so to thereby constrain the radial and axial excursions as described above. The bumper 44 is constructed to resist substantial impact loads both axially and radially during the initial phase of an FBO event and to then also to survive and contain the axial and radial loads transmitted through the #2 bearing 28 during windmilling. According to one embodiment, the bumper 44 is made of stainless steel.

The bumper 44 has a ring portion 44a and a mounting flange portion 44b extending radially outwardly from the outer surface of the ring portion 44a. The bumper 44 is preferably attached to the bearing support 40 independently of the second bearing 28 by bolts 46 mounted in registering holes respectively defined in the radially outer end of the flange portion 44b of the bumper 44 and in the larger diameter end portion of the second frusto-conical portion 40b of the bearing support 40. The ring portion 44a of the bumper 44 has a circular radially inner surface disposed in close proximity to a radially outer surface of the outer race 36 of the #2 bearing 28 and defining therewith an annular radial gap 48. The radial gap 48 has a radial size which is sized so that, in use, the natural vibratory frequency of the low pressure shaft 22 as it orbits about the central axis 11 of the engine 10 after decoupling at the second bearing 28 is tuned to a desired frequency or to avoid undesired frequency(ies). The radial thickness of the gap 48 is preferably also sized such as to not excite other modes of the engine or aircraft. It is preferably sized within a range that is large enough to dampen the undesired modes and yet not large enough to have the high and low pressure shafts 20, 22 contact one another or otherwise interact adversely. According to one example, the radial size of the gap 48 is between 0.09" and 0.15". It is understood that each engine, depending on its mass and resonance (among other factors), would have a different gap.

Optionally, the axially front end of the ring portion 44a of the bumper 44 has an annular axially forwardly facing surface 44c which is axially spaced from an opposing axially rearwardly facing surface of the mounting flange 38 of the

2 bearing 28 by an axial gap 50. The annular axially facing surface 44c of the bumper 44 provides an arresting or abutment surface against which, in use, the axially rearwardly facing surface of the mounting flange 38 may come into contact when moved axially rearwardly under thrust forces after decoupling. The mounting flange 38 of the outer race 36 is axially trapped between the mounting flange 40c of the support bearing 40 and the bumper 44. The axial gap 50 may be used to limit how far rearwardly the low pressure spool may move after an FBO event. The axial gap 50 may be sized within a range that is large enough to allow the outer bearing race 36 to axially come off the spigot 40d upon rupturing of the frangible bolts 42 and is small enough to prevent the low spool from gaining too much kinetic energy. Typically, the longer the low pressure spool accelerates after rupturing of the bolts 42, the more severe the impact with the bumper 44 will be. The axial gap 50 is thus preferably kept small to contact the low pressure spool as soon as possible after decoupling to impede excessive acceleration, which may assist the bumper 44 sustain less loads, and therefore damage, from the initial impact of the second bearing 28. Also, the axially facing surfaces 38a, 44c of the bearing 28 and the bumper 44 interact axially to prevent the low pressure shaft 22 and the high pressure shaft 20 from contacting each other adversely which could eventually result in the rupturing of the low pressure shaft 22 and lead to a catastrophic event.

The outer race 36 of the bearing 28 may have a flange 39 projecting radially outwardly from a rear end portion thereof. The rear flange 39 is axially spaced from the ring portion 44a of the bumper 44 by an axial aft gap 51. As will be seen hereafter, in use the bearing 28 may move within the axially forward and aft gaps 50 and 51 after decoupling. Axial retention after a FBO event is achieved in this example by entrapment of the bearing outer race 36 between the main bearing support 40 and the bumper 44.

The ring 44a need not be a ring, per se, but rather be any generally annular assembly suited to functionality described herein, and may be suitably configured as a monolithic structure, a segmented structure, a contiguous annular structure, an interrupted annular structure, and so on. Still other modifications will be apparent to skilled reader.

The reader will also appreciate that axial containment of the LP rotor may be provided by any suitable arrangement and need not be incorporated into the bumper assembly as described herein.

From the foregoing, it can be appreciated that the bumper 44 is positioned relative to the second bearing 28 both limit and control the movement of the bearing outer race, and thus the low pressure shaft 22, after franging.

During normal engine operation, the bumper 44 is inactive. However, in the unlikely event of an FBO or other exceptional event resulting in excessive rotor imbalance conditions, considerable radial loads are transmitted from the low pressure shaft 22 to the first and second bearings 26 and 28. When these loads reach a critical value, the #1 bearing support 27 is configured to buckle or otherwise deform or frange, thereby decoupling the first bearing 26 from the stator structure of the engine 10. Since such franging of the #1 bearing support 27 has left the upstream end of the low pressure shaft 22 with considerably reduced radial support (if any), the upstream end of the low pressure shaft 22 will tend to start orbiting about its axis 11. The orbiting of the low pressure shaft 22 and the bending loads on the shaft 22 will tend to induce moment loads on the #2 bearing 28. These additional loads on the #2 bearing 28 will tend to rupture the shear bolts 42, releasing the second bearing 28 from the spigot 40d, thereby decoupling the #2 bearing 28 from the stator structure of the engine 10. Upon decoupling, the second bearing 28 will radially tend to impact upon the bumper 44, and in this example any axial movement of the rotor will also be constrained by the described assembly. The axial and radial gaps 50 and 48 are, as described above, preferably sized to minimize the initial impact forces that the bumper 44 has to survive, as well as tune out unwanted vibratory modes and generally control load transfer to the engine and aircraft. At this point, the #2 bearing 28 is free to orbit in a larger diameter within the rigid ring portion 44a of the bumper 44 preferably such that the resonance of the low pressure shaft as it goes through its modes cannot couple to the engine hardware. The radial excursions and preferably also axial movement of the low pressure shaft 22 during windmilling is constrained by the bumper assembly. The constraining action of the bumper 44 on the orbiting motion of the low pressure shaft 22 also preferably impedes intershaft and other harmful rubbing. The reduced radial support stiffness may be tuned to impede the low pressure spool from approaching its natural frequency of vibration to thereby limit transmission of harmful or unwanted loads or vibrations to the airframe, including cockpit or cabin.

The given examples of the frangible bearing support structure allow reducing the transmission of loads from the LP rotor to the engine and aircraft frame structures in the event of a FBO event. The cabin noise is addressed through utilization of existing engine hardware, with the exception of the bumper, as opposed to adding specially designed mitigation devices. The buckling/franging of the first bearing support followed by franging the #2 bearing support provides a mechanism by which the LP rotor running through the resonance at a lower speed. Avoidance of the selected resonance may be used to limit cockpit, cabin or other airframe accelerations to within desired levels during engine windmilling.

The above description is meant to be exemplary only, and one skilled in the art will recognize that changes may be made to the embodiments described without departing from the scope of the invention disclosed. For example, different materials, different combination of loading in the fusible structures or bolts, different arrangement of bearings or bearings support flanges, different types of fusible bolts, different numbers or sizes of fusible bolts. Still other modifications which fall within the scope of the present invention will be apparent to those skilled in the art, in light of a review of this disclosure, and such modifications are intended to fall within the appended claims.

What is claimed is:

1. A bearing arrangement for supporting a fan rotor of an aircraft engine, comprising a bearing having rolling elements disposed between inner and outer races, the outer race having first and second axially spaced-apart flanges projecting radially outwardly from axially opposed end portions of the outer race, a bearing support for supporting the bearing on a stator structure of the engine, a decoupler between the bearing and the bearing support, the decoupler being configured to release the bearing from the bearing support when subject to a predetermined critical load, a bumper surrounding the bearing, the bumper being axially disposed between the first and second axially spaced-apart flanges of the outer race, the bumper and the outer race of the bearing defining a radial gap and an axial gap therebetween, the bearing being free to move within said radial and axial gaps when the fan rotor rotates at windmilling speed after decoupling of the bearing from the bearing support, wherein the bearing support has a radially inwardly projecting flange, the first flange of the outer race forming with the radially inwardly projecting flange of the bearing support an inverted flange arrangement, and wherein the decoupler comprises a set of frangible fasteners, the first flange of the outer race being attached to the radially inwardly projecting flange of the bearing support by said frangible fasteners.

2. The bearing arrangement defined in claim 1, wherein the radial gap is sized to tune the natural frequency of vibration of the fan rotor at higher speeds than the windmilling speed.

3. The bearing arrangement defined in claim 1, wherein the first flange of the outer race is spaced axially forwardly of a front axially facing surface of the bumper by an axial fore gap.

4. The bearing arrangement defined in claim 3, wherein the axial fore gap is sized to allow the outer race to move off from a spigot projecting axially rearwardly from the bearing support.

5. The bearing arrangement defined in claim 3, wherein the second flange of the outer race is axially spaced rearwardly from a corresponding rear abutting surface on the bumper by an axial aft gap.

\* \* \* \* \*